United States Patent

[11] 3,577,010

[72] Inventors Edward N. Freyling, Jr.;
Robert E. Gregson, Scottsdale, Ariz.
[21] Appl. No. 795,577
[22] Filed Jan. 31, 1969
[45] Patented May 4, 1971
[73] Assignee Motorola, Inc.
Franklin Park, Ill.

[54] ZERO POINT SWITCHING CIRCUIT FOR TURN-ON OF GATE CONTROLLED CONDUCTING DEVICES
9 Claims, 6 Drawing Figs.

[52] U.S. Cl. .......... 307/252, 307/133, 307/305
[51] Int. Cl. .......... H03k 17/00
[50] Field of Search .......... 307/252, 305, 133; 323/(ZS)

[56] References Cited
UNITED STATES PATENTS
3,335,291 8/1967 Gutzwiller .......... 307/252
3,440,445 4/1969 Kusa .......... 307/252

*Primary Examiner*—Donald D. Forrer
*Assistant Examiner*—John Zazworsky
*Attorney*—Mueller & Aichele

ABSTRACT: A zero point switching circuit for an SCR coupled in series with an AC source and a load is described. The combination of a switch, a first diode and a voltage divider is coupled across the source. The variable tap of the divider is coupled via a second diode and a first capacitor to the first diode. A second capacitor is coupled across the voltage divider. When the switch is closed, the first capacitor charges during one-half cycle toward a voltage level determined by the divider. The discharge path for the first capacitor is provided by a three-layer diode coupled between the control electrode of the SCR and the first capacitor. When the line voltage decreases prior to the next half cycle, the first capacitor voltage exceeds the threshold voltage of the three-layer diode whereby this capacitor discharges through the SCR into the second capacitor. The second capacitor charges to a voltage sufficient to render the three-layer diode nonconductive and then discharges through the voltage divider to permit the first capacitor to again discharge into the gate of the SCR. As a result, the first capacitor repetitively discharges into the gate of the SCR with large current spikes at or just prior to the zero point of the line voltage.

INVENTOR.
Edward N. Freyling, Jr.
Robert E. Gregson
BY
Mueller, Aichele, & Rauner
Att'ys

ZERO POINT SWITCHING CIRCUIT FOR TURN-ON OF GATE CONTROLLED CONDUCTING DEVICES

BACKGROUND OF THE INVENTION

This invention relates to switching circuits for gate-controlled semiconductor devices and, more particularly, to a zero point switching circuit for silicon-controlled rectifiers (SCR).

At present, gate-controlled semiconductor devices are being increasingly utilized because of their compactness and efficiency to control the power supplied from AC sources to a variety of loads. Perhaps the best known member of this family of gate-controlled semiconductor devices is the SCR. Conventional SCR control circuits generally permit the SCR to be turned on at any phase angle between 0° and 180° of the voltage applied between the SCR anode and cathode electrodes. As a result, a switching transient occurs every time an SCR is switched on at some phase angle above zero or less than 180°. These switching transients generate radio frequency interference (RFI) and are detrimental either directly or indirectly to circuits operating in the same area.

In order to minimize these transients, two conditions should be met; first, the gate current should be applied as the anode-to-cathode voltage passes through the zero point in a positive manner thereby causing the SCR to become conductive when the anode voltage is going or about to go positive and secondly, the circuit should be switched off as the current through the SCR passes through zero. In an SCR circuit controlling AC power, the latter of these two conditions is met automatically as a result of the inherent latching characteristic of the SCR. This latching characteristic provides natural commutation due to the fact that an SCR is turned off or rendered nonconductive when the anode-to-cathode current falls below a minimum holding threshold. In the absence of an appropriate gate current, the SCR will remain nonconductive. Consequently, the SCR turns off automatically at the zero point of the AC voltage waveform appearing thereacross. Thus, the primary cause of RFI occurs during the turn-on of the SCR.

While RFI can be eliminated by the use of noise filters or the physical shielding of the circuit containing the gate-controlled switching elements, these techniques are relatively expensive. Thus, the use of a control circuit coupled to the gate electrode of the SCR to insure zero point turn-on is preferred. Accordingly, the present invention is directed to a switching circuit which insures that an SCR is rendered conductive at the zero crossover point of the SCR anode-to-cathode AC voltage. Further, the circuit is especially well suited for supplying large quantities of gate current to render conductive SCR's of the type requiring a relatively large gate current, example 50 milliamperes. Consequently, the energy delivered to the load is essentially free of RFI and the need for filtering and/or shielding of the circuit is eliminated.

SUMMARY OF THE INVENTION

The present invention is directed to a control circuit for regulating the turn-on time of a gate-controlled conducting device connected in circuit relation with an alternating voltage source and a load. The control circuit includes the combination of a switching means, a first unidirectional current means and a voltage divider coupled across the alternating source. The first current means is poled to pass current during the half cycle that the gate-controlled device is normally nonconductive. The voltage divider of the combination is provided with a variable tap or terminal which is maintained at a voltage determined by its position on the divider. This variable tap is coupled through a second unidirectional current means and a capacitor to the first current means. The second current means is poled to pass current flowing from the variable terminal of the divider to the capacitor (herein referred to as the second capacitor). The connection between the capacitor and the second current means is coupled through a voltage-controlled semiconductor device and a third unidirectional current means to the gate electrode of the gate-controlled device. A first capacitor is coupled between the first and second terminals of the voltage divider. In addition, the second capacitor is coupled between the first and second current means, or in other words, between the first terminal and the variable tap of the divider.

The operation of the circuit begins when the switch is closed. During the half cycle that the SCR would normally be rendered conductive, i.e., when the anode-to-cathode voltage is positive, the first current means is reverse biased and prevents the second capacitor from being charged. During the following half cycle, the voltage applied across the SCR prevents it from becoming conductive. However, at this time, the second capacitor begins to charge through a portion of the voltage divider toward the limit of the voltage set by the position of the variable tap on the divider. When the peak line voltage is reached during this half cycle, the second capacitor is charged to approximately its maximum voltage.

As the line voltage begins to decrease, the voltage across the series combination of the voltage-controlled device, the third current means and the gate-cathode junction of the SCR begins to increase to the point where the voltage thereacross exceeds the threshold voltage of the voltage-controlled device. At this time, the voltage-controlled device is rendered conductive and breaks back to a lower voltage. Thus, the second capacitor discharges through the combination of the voltage-controlled device, the third current means and the gate-electrode of the SCR into the first capacitor.

When the second capacitor discharges into the first capacitor, the voltage across the first capacitor increases to the point where the voltage across the voltage-controlled device is less than the threshold and is therefore insufficient to maintain it in the conductive state. As a result, further discharge from the second capacitor into the gate-electrode of the gate-controlled device is prevented until the first capacitor discharges to a lower voltage level. The discharge path for the first capacitor is provided through the voltage divider. When the first capacitor has discharged to the point where the voltage across the voltage-controlled device exceeds its threshold voltage, the device becomes conductive and the second capacitor again discharges into the gate electrode of the SCR. This sequence is repetitive until the second capacitor is essentially discharged. Consequently a series of relatively large current spikes is applied to the gate-electrode of the SCR. These current spikes occur in a relatively short interval at about the time that the anode-to-cathode voltage across the SCR is becoming positive, i.e., passing through the zero voltage level. This insures that the SCR is driven into conduction at essentially its zero voltage level and, therefore, eliminates the switching transients heretofore characteristic of SCR circuit operation.

Further features and advantages of the invention will become more readily apparent from the following description of a specific embodiment of the invention when taken in conjunction with the accompanying drawings.

DESCRIPTION OF THE PREFERRED EMBODIMENT

Figure 1:
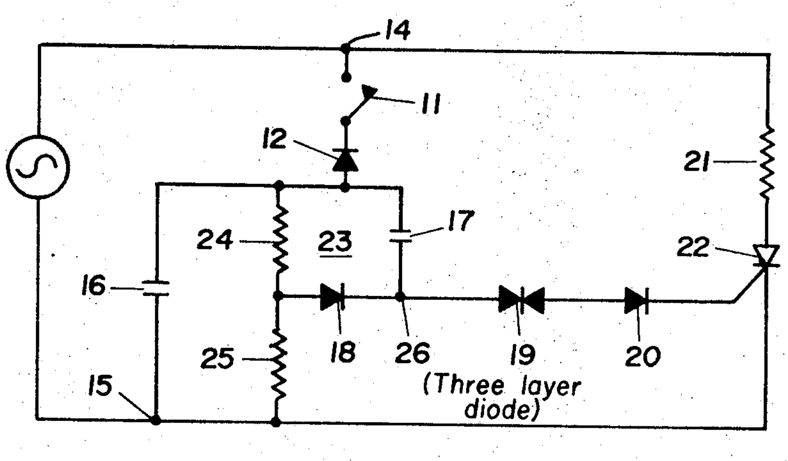
FIG. 1 is an electrical schematic diagram of one embodiment of the invention.

Referring now to FIG. 1, load 21 and SCR 22 are shown coupled in circuit relation with an alternating source. When the SCR is rendered conductive, essentially the entire AC voltage between terminals 14 and 15 appears across the load 21. However, when the SCR is nonconductive, the voltage appears across it. Thus, controlling the conductivity of the SCR regulates the power supplied to the load. The voltage on the SCR is referred to herein as positive when terminal 14 is positive with respect to terminal 15.

The combination of switch 11, first diode 12 and voltage divider 23 are shown coupled across the alternating source. The voltage divider 23 is shown coupled across the alternating source. The voltage divider includes resistors 24 and 25. While a fixed voltage divider 23 is shown in the described embodiment, it will be recognized that a variable voltage divider can be used if desired for a particular application. A first capacitor 16 is coupled across the voltage divider.

A second diode 18 is coupled to the center tap or terminal of the voltage divider 23. In addition, a second capacitor 17 is coupled between the cathode of the second diode and the anode electrode of the first diode 12. The capacitor 17 is relatively large, for example 25 times the capacitance of capacitor 16 for reasons that will later be discussed. As shown, the cathode electrode of diode 18 is coupled via a three-layer diode 19 and a third diode 20 to the gate electrode of SCR 22. The third diode is provided to prevent reverse breakdown of the gate-cathode junction of the SCR during its normally nonconductive half cycle. The three-layer diode is a voltage-controlled device characterized by the fact that it remains in a nonconductive state until the voltage thereacross reaches a predetermined threshold. When this voltage threshold is reached, the device becomes conductive and breaks back to a lower voltage thereacross. In a typical three-layer diode, the threshold voltage is about 30 volts and the break back or lower voltage thereacross is approximately 20 volts.

Figures 2, 3, 4, 5, 6:
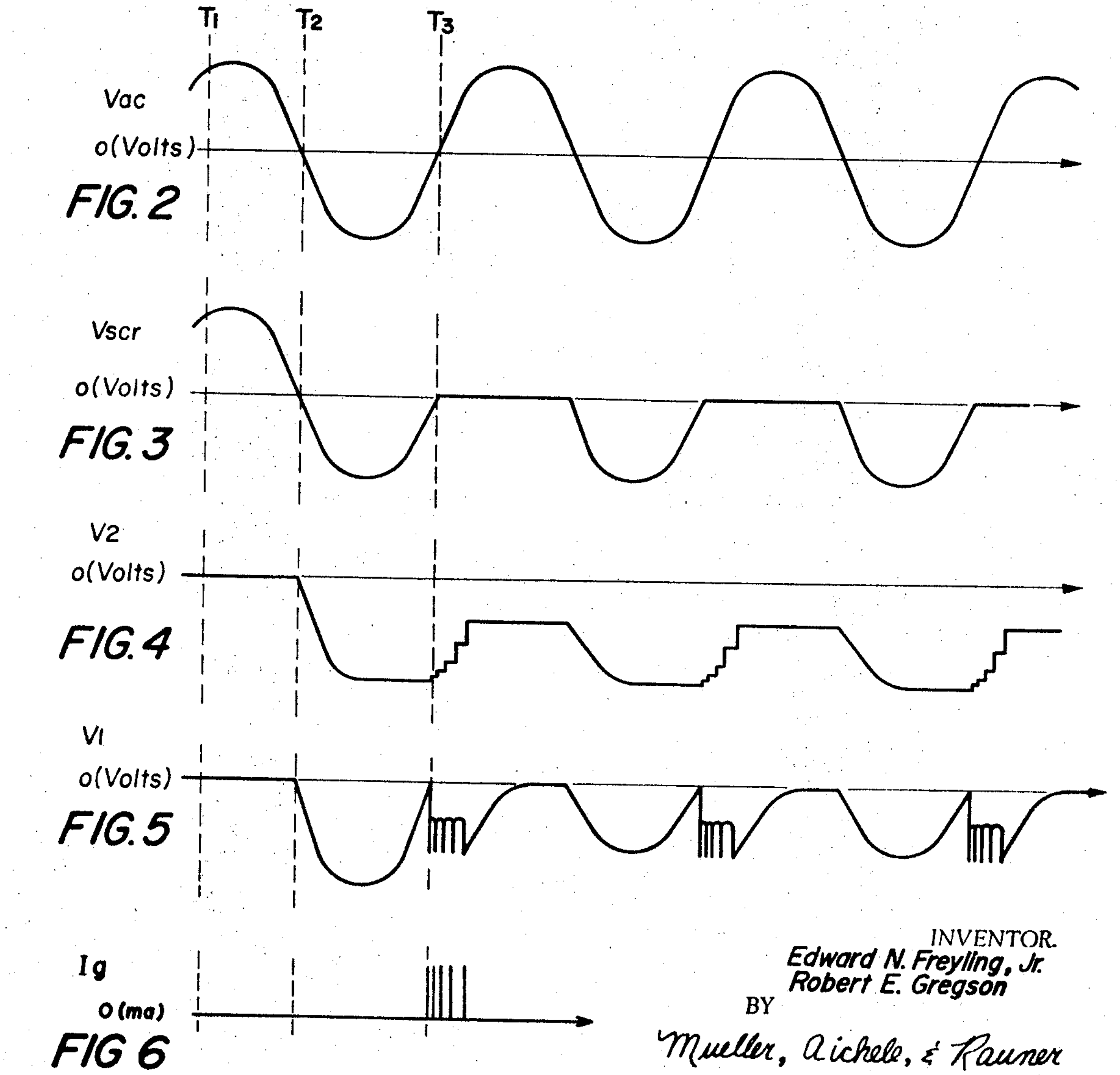
FIGS. 2—6 illustrate waveforms occurring at various points throughout the embodiment of FIG. 1.

The waveform of the voltage V*ac* provided by the alternating source and appearing between terminals 14 and 15 is shown in FIG. 2. The voltage between the anode and cathode electrodes of the SCR 22 is shown in FIG. 3. When the SCR 22 is in its nonconductive state, essentially the entire alternating voltage V*ac* appears thereacross.

When the SCR 22 is rendered conductive, it will be conductive during the portion of the voltage thereacross wherein the anode electrode is positive with respect to the cathode electrode. Consequently, the positive half cycles can be applied across load 21 if the SCR is turned on.

The operation of the circuit is best described with the closing of switch 11. If terminal 14 is positive with respect to terminal 15 as shown at T1 in FIGS. 2 and 3, diode 12 is reversed biased and capacitors 16 and 17 are not charged. In addition, no gate current is supplied to the gate-electrode of SCR 22 and the SCR remains nonconductive.

During the following half cycle starting at time T2, diode 12 is conductive since terminal 15 is positive with respect to terminal 14 and capacitor 17 charges through resistor 25 of voltage divider 23 and diode 18. It shall be noted that diode 18 is poled to pass current flowing from the voltage divider to the first capacitor. The voltage V2 across capacitor 17 is shown in FIG. 4 wherein it will be noted that the voltage across the capacitor reaches a maximum at essentially the same time that the voltage at terminal 15 reaches maximum. As the voltage at terminal 15 decreases during the latter portion of this half cycle of voltage V*ac* the voltage across three-layer diode 19 increases since the capacitor voltage places terminal 26 at a higher voltage than terminal 15. When the voltage thereacross reaches the threshold voltage level of three-layer diode 19, diode 19 becomes conductive and breaks back to a voltage which is substantially smaller. As a result, capacitor 17 discharges initially at time T3 through the combination of three-layer diode 19, third diode 20 and the gate-cathode junction of SCR 22. The discharge current from capacitor 17 charges capacitor 16 to a voltage V1, shown in FIG. 5. The capacitor 16 is smaller than capacitor 17 and is charged to a voltage which is sufficient to render three-layer diode 19 nonconductive. Consequently, capacitor 17 ceases to discharge until capacitor 16 has discharged to the point where the voltage across three-layer diode 19 exceeds its threshold voltage level. The discharge path for capacitor 16 is through resistors 24 and 25, voltage divider 23 and the interval between successive discharges of capacitor 17 is determined primarily by the R.C. time constant thereof. The voltage V1 appearing across capacitor 16 shown in FIG. 5 of the drawings is seen to rise in a spikelike manner, decrease towards zero and then suddenly increase again. The voltage decreases to the point where the voltage difference between terminals 26 and 15 is equal to the threshold voltage of the three-layer diode 19. Thus, the voltage across capacitor 16 varies rapidly dependent upon its state of charge.

The gate current I*g* shown in FIG. 6 is comprised of a series of spikes which occur when capacitor 17 discharges and the three-layer diode breaks back to its low voltage state. These spikes occur prior to and during the time that the voltage V*ac* is at the zero point. To insure that the current spikes continue during an interval sufficient to fire the SCR, capacitor 16 is required to be relatively small when compared with capacitor 17. In practice, capacitor 16 should not exceed one-tenth the capacitance of capacitor 17 in order to provide a large number of current spikes.

Since the voltage to which capacitor 17 charges is determined by the ratio of resistors 24 and 25 of voltage divider 23 and the magnitude of the alternating voltage appearing between terminals 14 and 15, the magnitude of the resistors comprising the voltage divider are selected in combination with the threshold voltage of the particular three-layer diode employed. This is due to the fact that capacitor 17 should undergo its initial discharge prior to the time that the voltage at terminal 15 drops to zero. Since current pulses supplied to the SCR 22 at a time when its anode electrode is negative with respect to its cathode electrode have no affect on the conductivity of the SCR, it is preferable to begin the gate current pulses prior to the zero voltage level of the alternating source. The repetitive discharging and charging of capacitor 16 is continued until capacitor 17 discharges to a voltage essentially equal to the breakback low voltage of the three-layer diode 19.

The burst of high current gate pulses I*g* which start just before the line voltage V*ac* goes through zero and lasts into the cycle when the anode of the SCR is turned on essentially at its zero point and no significant switching transient occurs. As a result, the generation of radio frequency interference is essentially eliminated.

The frequency at which the three-layer diode 19 becomes conductive or, in other words, the number of current pulses and the interval therebetween applied to the gate electrode of SCR 22 is determined by the time constant of capacitor 16. This is a function of the resistance of the voltage divider 23 and the magnitude of the capacitor and can be selected in accordance with the particular gate-controlled conducting device employed.

In one embodiment listed and operated, the alternating voltage was 120 volts R.M.S. and the ratio of resistor 25 to resistor 24 was approximately 2 to 1 so that capacitor 17 charged to approximately 40 volts. The voltage threshold of three-layer diode 19 was 30 volts and the breakback voltage was about 20 volts. Thus, the circuit operated with the voltage-controlled device breaking back to its lower voltage when the voltage at terminal 15 was 10 volts positive with respect to the voltage at terminal 14. The current pulses were approximately 50 milliamperes in magnitude and began at approximately 0.75 milliseconds prior to the time that the alternating voltage V*ac* crossed the zero level. The ratio of capacitor 17 to capacitor 16 was 25 to 1 which enabled capacitor 16 to attain a voltage sufficient to render three-layer diode 19 nonconductive without requiring a substantial amount of charge from capacitor 17.

The component values utilized in the tested embodiment were:

| | |
|---|---|
| Resistor **24** | 3.9 kilohms |
| Resistor **25** | 8.2 kilohms |
| Capacitor **16** | 0.01 ∞fd. |
| Capacitor **17** | 0.25 μfd. |

While the above description has referred to a specific embodiment of the invention it will be recognized that many variations and modifications may be made therein without departing from the spirit and scope of the invention.

We claim:

1. A control circuit for regulating turn-on of a gate-controlled semiconductor device connected in circuit relation with an alternating source in the load, said circuit comprising:

a. first unidirectional current means having first and second electrodes and poled to pass current flowing from said first to second electrodes;

b. a voltage divider having first, second and third terminals, the first terminal of said divider being coupled to the first electrode of said current means; the second electrode of said first current means and the second terminal of said voltage divider being coupled across the alternating source, the voltage appearing at the third terminal of said divider being less than the voltage between the first and second terminals thereof;

c. a first capacitor coupled between the first and second terminals of said voltage divider;

d. second unidirectional current means having first and second electrodes and poled to pass current flowing from said first and second electrodes, the first electrode of said second current means being coupled to the third terminal of said voltage divider;

e. a second capacitor coupled between the first electrode of said first current means and the second electrode of said second current means; and f. a voltage-controlled semiconductor device coupled between the second electrode of said second current means and the gate electrode of said gate-controlled device, said voltage-controlled device becoming conductive when the voltage thereacross reaches a predetermined threshold, said second capacitor being charged to a voltage exceeding the threshold of said voltage-controlled device by the alternating source whereby said second capacitor discharges through the gate electrode of the gate control device and charges said first capacitor, said first capacitor discharging through said voltage divider whereupon said second capacitor repetitively discharges through said gate-controlled device.

2. The circuit in accordance with claim 1 further comprising a third unidirectional current means having first and second electrôdes and poled to pass current flowing from said first to second electrodes, said first electrode being coupled to the voltage-controlled device, said second electrode being coupled to the gate electrode of said gate control device.

3. The circuit in accordance with claim 2 further comprising switching means connected in circuit relation with said first current means and said voltage divider.

4. The circuit in accordance with claim 3 wherein said voltage-controlled device is a three-layer diode.

5. The circuit in accordance with claim 4 wherein said gate-controlled device is a silicon-controlled rectifier.

6. The circuit in accordance with claim 5 wherein said second capacitor is relatively large with respect to said first capacitor.

7. A control circuit for regulating turn-on of gate-controlled semiconductor device connected in circuit relation with an alternating source and a load, said circuit comprising:

a. switching means having first and second terminals, the first terminal of said switching means being connected in circuit relation with the alternating source;

b. first unidirectional current means having first and second electrodes and poled to pass current flowing from said first to second electrode, said second electrode being coupled to the second terminal of said switching means;

c. a voltage divider having first, second and third terminals, the first terminal of said divider being coupled to the first electrode of said first current means, the second terminal of said divider being coupled in circuit relation with the alternating source, the voltage at the third terminal of said divider being less than the voltage appearing between the first and second terminals thereof;

d. a first capacitor coupled between the first and second terminals of said voltage divider;

e. the second unidirectional current means having first and second electrodes and poled to pass current flowing from said first to second electrode, the first electrode of said second current means being coupled to the third terminal of said divider;

f. a second capacitor coupled between the first terminal of said divider and the second electrode of said second current means, said second capacitor being relatively large with respect to said first capacitor;

g. a voltage-controlled semiconductor device having first and second electrodes, said device becoming conductive only when the voltage thereacross reaches a predetermined threshold, the first electrode of said device being coupled to the second electrode of said second current means; and h. third unidirectional current means having first and second electrodes and poled to pass current flowing from said first to second electrodes, said first electrode being coupled to the second electrode of said control device, said second electrode being coupled to the gate electrode of said gate-controlled device, the actuation of said switching means resulting in the charging of said second capacitor to a voltage which causes said voltage control device to pass current to the gate electrode of said gate control device and thereby charge said first capacitor and render the voltage-controlled device nonconductive, the first capacitor discharging through said voltage divider to thereby cause said second capacitor to repetitively discharge through the gate electrode of said gate-controlled device.

8. The circuit in accordance with claim 7 wherein said voltage-controlled device is a three-layered diode.

9. The circuit in accordance with claim 8 wherein said gate-controlled device is an SCR.